(12) United States Patent
Peacos, III et al.

(10) Patent No.: US 8,875,535 B2
(45) Date of Patent: Nov. 4, 2014

(54) COMPACT CONDENSER MODULE INCLUDING A TORTUOUS PATH FOR REMOVING WATER DROPLETS FROM AIR

(75) Inventors: Frederick Peacos, III, North Scituate, RI (US); Donald E. Army, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1031 days.

(21) Appl. No.: 12/629,312

(22) Filed: Dec. 2, 2009

(65) Prior Publication Data

US 2011/0126572 A1 Jun. 2, 2011

(51) Int. Cl.
 F28D 5/00 (2006.01)
 B64D 13/00 (2006.01)
 B64D 13/06 (2006.01)
 F24F 3/14 (2006.01)

(52) U.S. Cl.
 CPC .............. *B64D 13/00* (2013.01); *Y02T 50/44* (2013.01); *B64D 2013/0662* (2013.01); *F24F 2003/1446* (2013.01)
 USPC .............. 62/305; 62/93; 55/442; 55/396

(58) Field of Classification Search
 CPC ............................ B64D 13/00; B01D 45/16
 USPC ............... 165/109.1, 111, 114; 55/422, 396
 See application file for complete search history.

(56) References Cited

U.S. PATENT DOCUMENTS

| | | | |
|---|---|---|---|
| 2,921,646 A | 1/1960 | Poole | |
| 4,234,323 A | 11/1980 | Maher | |
| 4,517,813 A * | 5/1985 | Eggebrecht et al. | 62/284 |
| 4,629,481 A | 12/1986 | Echols | |
| 4,681,610 A | 7/1987 | Warner | |
| 5,634,964 A | 6/1997 | Army, Jr. et al. | |
| 5,663,121 A * | 9/1997 | Moody | 507/102 |
| 6,295,822 B1 | 10/2001 | Mueller | |
| 6,460,353 B2 * | 10/2002 | Udobot et al. | 62/86 |
| 6,517,596 B2 * | 2/2003 | Dodson et al. | 55/417 |
| 7,000,426 B2 | 2/2006 | Jeuch | |
| 7,077,892 B2 | 7/2006 | Lee | |
| 7,188,488 B2 | 3/2007 | Army, Jr. et al. | |
| 7,266,958 B2 | 9/2007 | Milde et al. | |
| 7,334,423 B2 | 2/2008 | Bruno et al. | |
| 7,389,639 B2 * | 6/2008 | Michalakos et al. | 60/309 |
| 7,470,300 B2 | 12/2008 | Faust et al. | |
| 7,591,869 B2 | 9/2009 | Jensen et al. | |
| 7,779,644 B2 * | 8/2010 | Decrisantis et al. | 62/401 |
| 7,837,752 B2 * | 11/2010 | Darke et al. | 55/385.1 |
| 2006/0275717 A1 | 12/2006 | Jensen et al. | |
| 2008/0087017 A1* | 4/2008 | Van Nimwegen | 60/599 |

FOREIGN PATENT DOCUMENTS

DE     10020055 A1   10/2001

OTHER PUBLICATIONS

Richard W. Smith—McDonnell Douglas Astronautics Co., Zero-G Water Selection Separator: A Performance Tradeoff, Feb. 1, 1969, SAE Technical Paper 690642, 1969, doi: 10.4271/690642.*
Extended European Search Report for Application No. EP 10 25 2041 dated May 12, 2014.

* cited by examiner

*Primary Examiner* — Cassey D Bauer
(74) *Attorney, Agent, or Firm* — Carlson, Gaskey & Olds

(57) ABSTRACT

A water collector is telescoped into the interior of an aircraft condenser. The condenser has a header for collecting air from the condenser and the water collector is disposed at least partially within the header.

20 Claims, 4 Drawing Sheets

COMPACT CONDENSER MODULE INCLUDING A TORTUOUS PATH FOR REMOVING WATER DROPLETS FROM AIR

BACKGROUND

The cool air stream discharged from a condenser of an air cycle air conditioning system for an aircraft, carries droplets of moisture that are generally removed by a water collector located downstream of the condenser and upstream of the air cycle machine. If the moisture is not removed from the airstream, the droplets, after passing through the air cycle machine may create a foggy or misty atmosphere or, on occasion freeze into ice that is discharged into the aircraft cabin. Further, the frozen droplets may cause a build-up of ice thereby reducing system efficiency and corroding system components.

Typically, the water collector concentrates the water on its walls by centrifugal means and then gravity causes the moisture to fall out of the separator as the water is subjected to a tortuous flow path of increasing volume.

SUMMARY

According to a non-limiting embodiment of the invention, a water collector is telescoped into the interior of an aircraft condenser. The condenser has a header for collecting air from the condenser and the water collector is disposed at least partially within the header.

According to a further non-limiting embodiment of the invention, a header collects air from a condenser. The header has a first surface that cooperates with a cartridge disposed at least partially within the header to form a water collector.

According to a further non-limiting embodiment of the invention, a cartridge for collecting water from air from a condenser a portion adapted to fit within the condenser to remove water from air therein.

According to a still further non-limiting embodiment of the invention, a condenser for condensing water in air has an opening adapted to receive a portion of a water collector.

DETAILED DESCRIPTION

Figure 1:
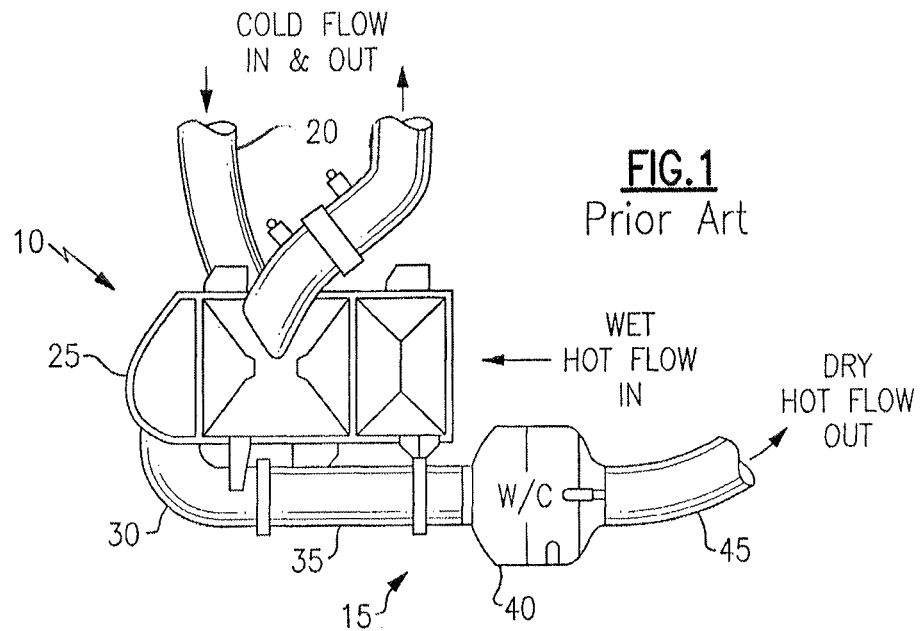
FIG. 1 is a schematic layout of a prior art condenser and water collector.

FIG. 1 shows a prior art condenser 10 and a water collector 15. A pair of inlet pipes 20 sends moisture-laden air to the condenser 10. The condenser, which condenses the moisture carried by the inlet pipes 20 into droplets, has a header 25 attaching to outlet pipes 30, 35 that direct the droplets and inlet air to the water collector 15. The water collector 15 removes the droplets received from the condenser and channels drier air to an air cycle machine (not shown) for conditioning. The water collector 15 has an inlet pipe 35 including swirl vanes (not shown), a bulbous portion 40 housing a tortuous path (not shown), and an outlet pipe 45. This prior art embodiment takes up too much space for modern aircraft that require more functionality in less space to reduce the weight and increase the efficiency of the aircraft.

Figure 2:
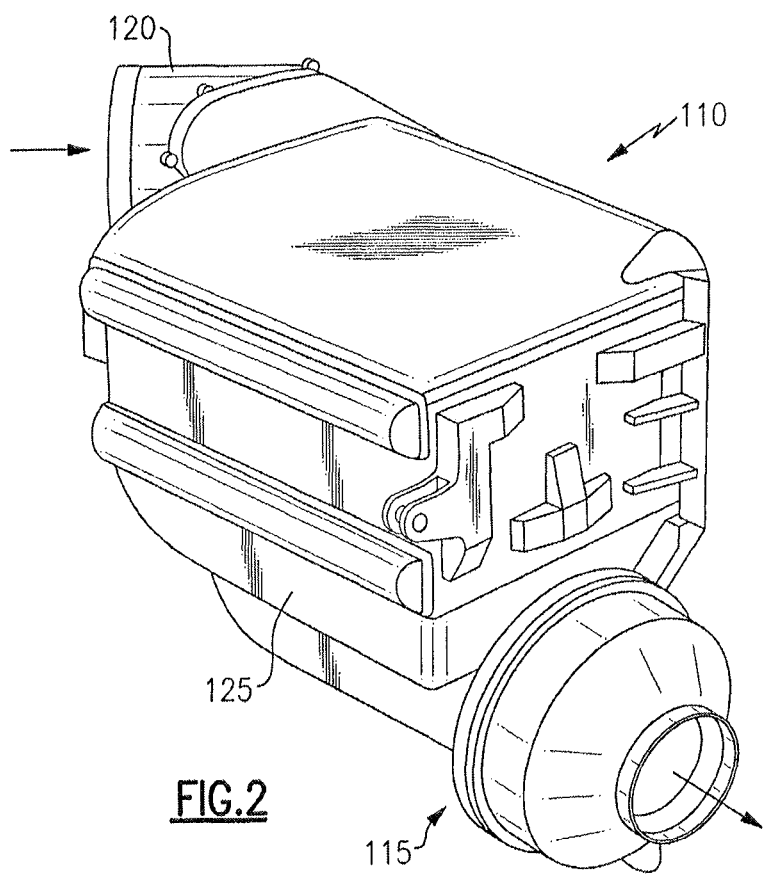
FIG. 2 is a perspective view of the water collector disposed in a condenser header.

Referring now to FIG. 2, an embodiment of the present invention is shown. A condenser 110 has inlet pipes 120 and a header 125 that cooperates with and is part of the water collector 115 as will be shown herein. One can see that the prior art external piping 30, 35 that previously connected the header (see FIG. 1) 25 to the external water collector 15 is eliminated thereby creating or minimizing the space required for the condenser 110 and the water collector 115.

Figure 3:
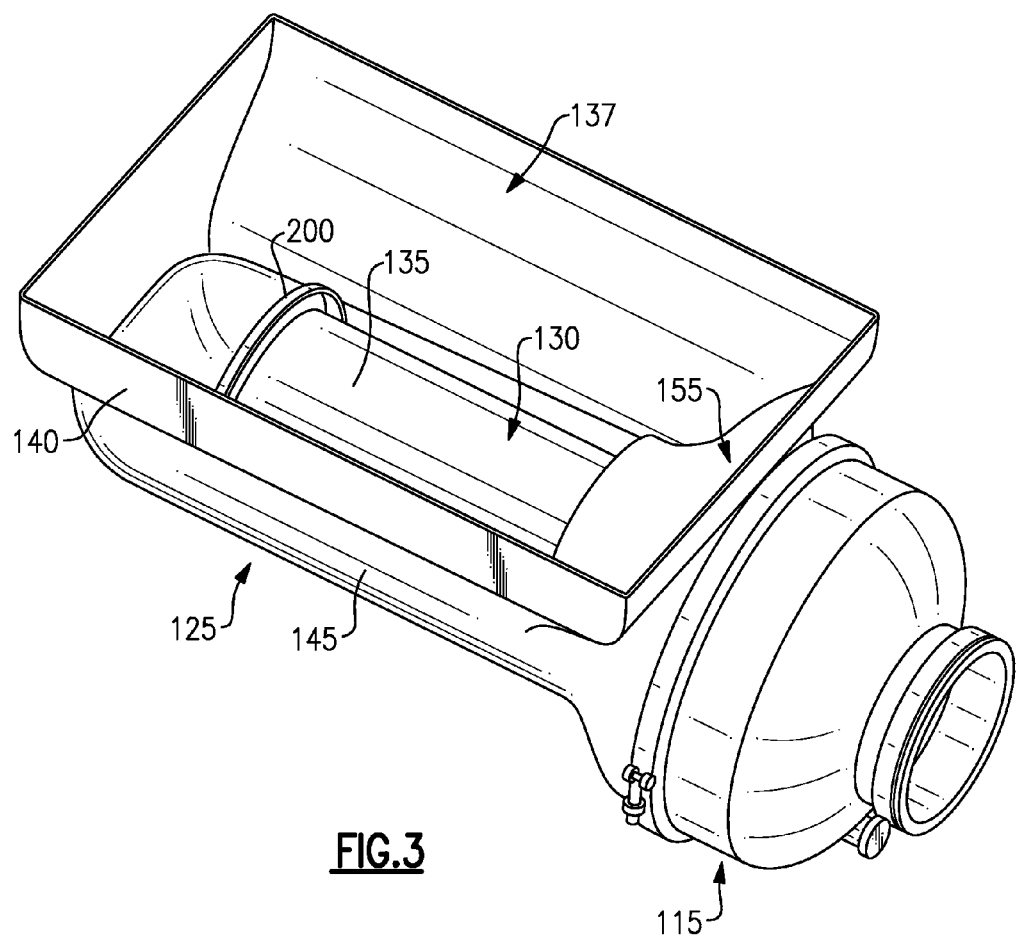
FIG. 3 is a perspective view of the header and the water collector of the invention of FIG. 2.
Figure 4:
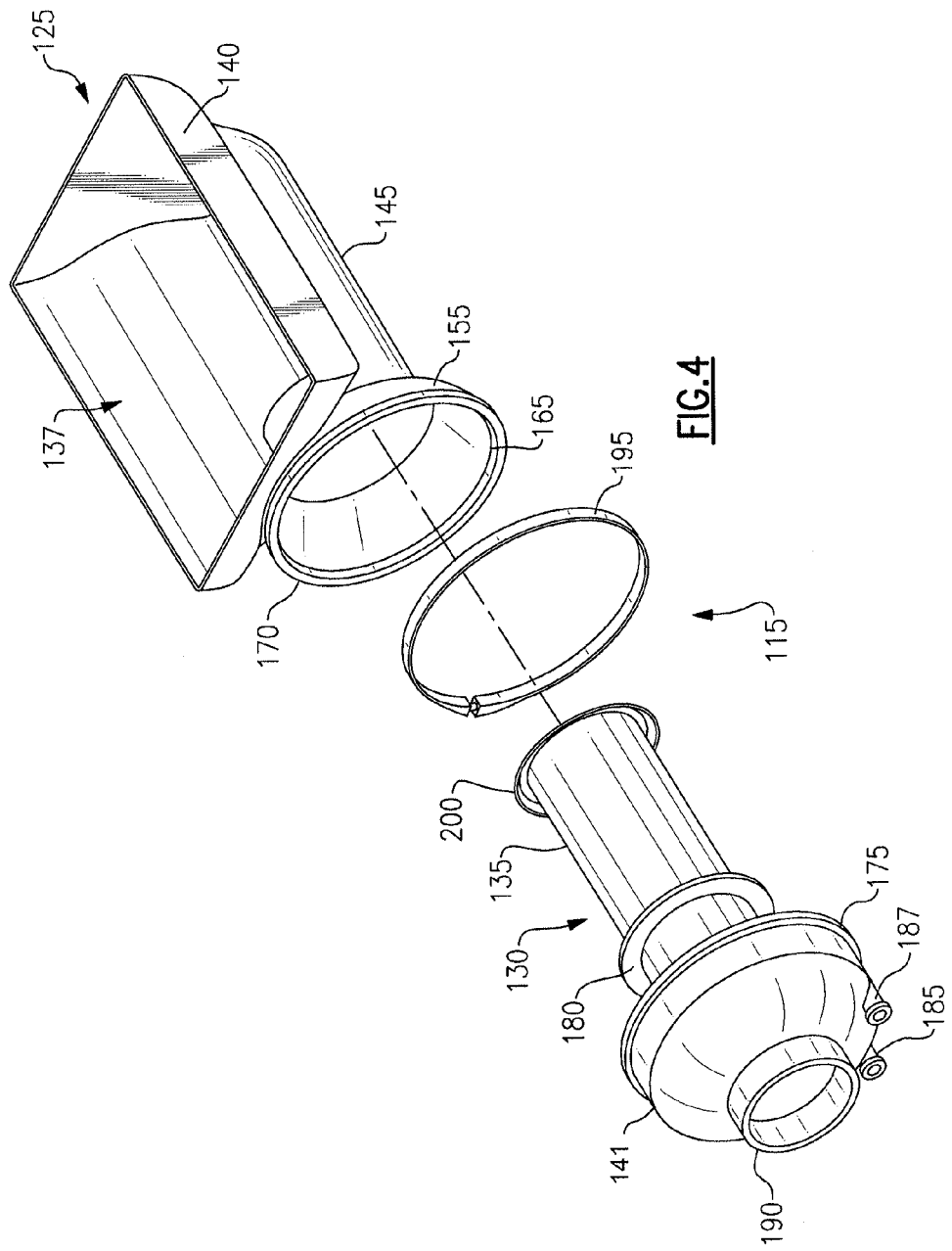
FIG. 4 is a view of the water collector and the condenser header broken down of FIG. 3.
Figure 5:
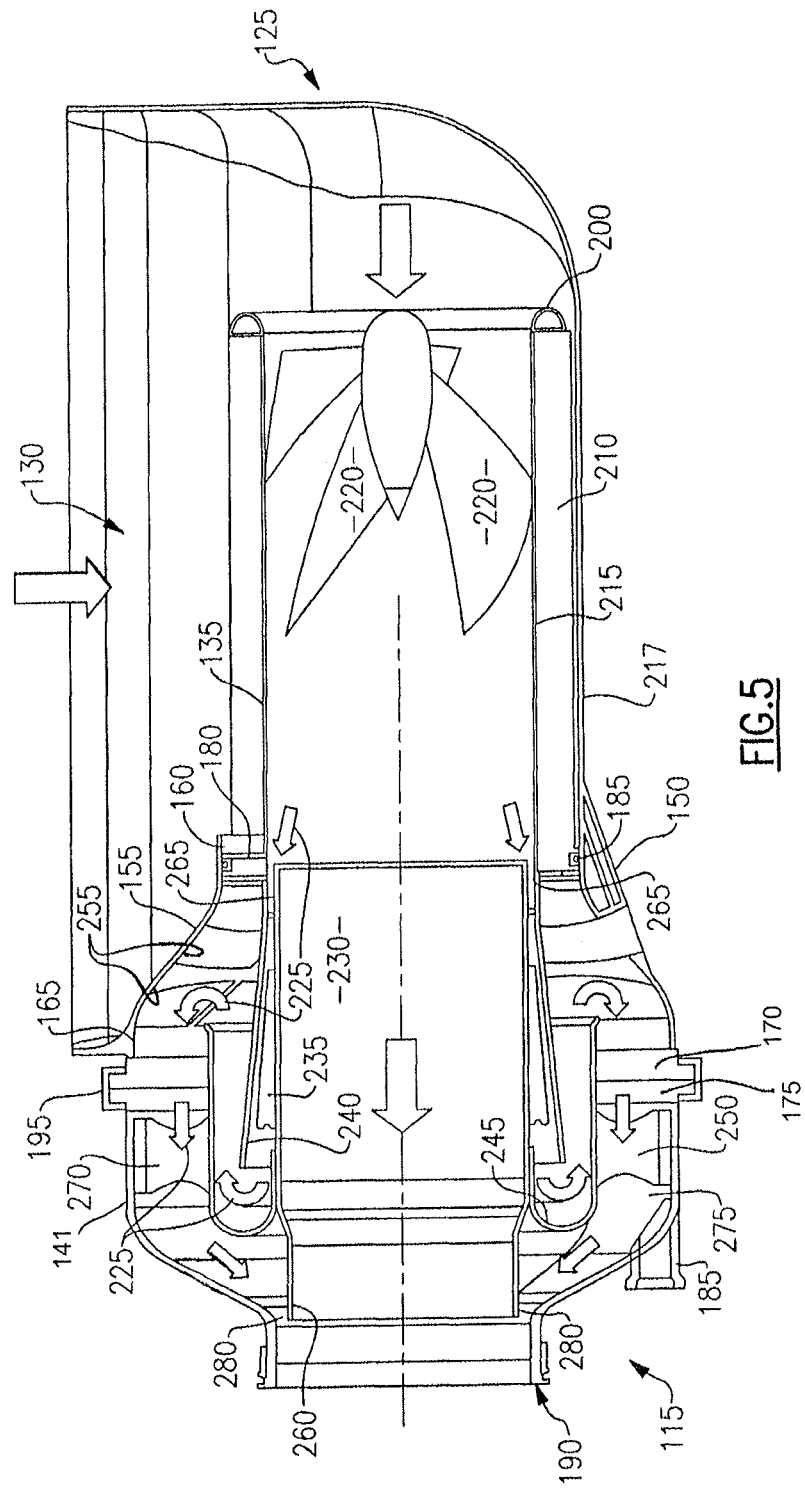
FIG. 5 is a cross sectional view of the condenser header and the water collector of FIG. 3.

Referring now to FIGS. 3, 4, and 5, the header 125 and a cartridge 130 are shown that combine together to form the water collector. The header has a rectangular opening 137 that attaches to the condenser 110, narrowing arcuate sides 140, and a lower trough 145 for receiving the cartridge 130. The trough angles downwardly to a drain 150 (see FIG. 5). The header has a circular plunger-shaped outlet 155, which forms part of the water collector and secures the cartridge 130 to the header 125 as will be shown herein. The plunger-shaped outlet 155 has a narrower inner radius 160 for sealing the cartridge 130 and the header 125 and a wider outer radius 165 for completing a tortuous path with the cartridge, and an outer V-band flange 170 that extends outwardly from the wider radius 165 to cooperate with a V-band flange 175 of the cartridge 130 as will be described herein.

The exterior of the cartridge has an inlet tube 135, a flange 180 extending radially from the inlet tube 135, a bulbous head 141, the V-band flange 175 extending along the exterior of the bulbous head 141, a water outlet pipe 185, an overflow port 187 (see FIG. 4) and an air outlet pipe 190. The inlet tube 135 fits within the inner radius 160 of the header and the flange 180 seals, using an o-ring 185 disposed against the header, the cartridge 130 from air in the header 125.

The V-band flange 175 on the bulbous head 141 and the V-band flange 170 on the header 125 are joined by a v-band coupling 195 to hold the header 125 and the cartridge 130 together. This easy coupling method allows easy access to the header for maintenance and simple replacement of the cartridge 130.

The inlet pipe 135 has an inlet radius 200 and a swirl blocker 210 formed of a long rectangular extension depending from a bottom 215 of the inlet tube 135. The swirl blocker 210 minimizes pressure gradients outside of the inlet pipe 135 to allow air to readily enter the inlet pipe. In addition, the swirl blocker 210 slows the flow of air at the bottom 217 of the header 125 so that droplets entrained on the inside of the header may drop to the bottom 217 and travel to the drain 150 for removal.

The inlet radius 200 acts as a guide to cause air passing from the condenser 110 to readily enter the inlet pipe of the cartridge without creating pressure gradients that might cause air not to enter the inlet pipe 135.

Referring now to FIG. 5, the cartridge includes swirl vanes 220 and a tortuous path (depicted by arrows 225) for directing water droplets formed on the walls of the inner wall of the water collector. The tortuous path 225 is formed by an inner tube 230 that is attached by vanes 235 to a flared portion 240 of the inlet tube 135, a "bundt" bowl 245 attached to the inner tube 230 and to the bulbous head 141 of the cartridge 130 by struts 250. One boundary of the tortuous path is formed by an inner portion 255 of the plunger-shaped outlet 155 that extends from the inner radius 160 to the outer radius 165. The inner tube 230 has a stepped down to a narrower cylindrical portion 260 to accelerate the flow of air therethrough as will be discussed herein. The swirl vanes 220 are placed at about 0.8 times the diameter of the inlet pipe from the inner tube 230 to give air swirled by the swirl vanes 220 space to deposit water droplets in the air on the inlet pipe walls.

The diameter of the inner tube 230 is less than the inlet pipe 135 to allow water collected on the walls of the inner tube to enter a gap 265 between the inner tube and the inner wall of the inlet pipe. Once entrained between the inner tube and the inlet pipe, the water follows the tortuous path 225 through and out of the curved interior of the "bundt" bowl 245, is turned by the inner portion 255 of the plunger-shaped outlet 155 from where it eventually enters into an area 270 of expanded volume along the outside of the "bundt" bowl 245. Continually expanded volume along the tortuous path 225 allows the water droplets collected on the outside walls to slow and then gravity causes the water droplets on inner walls of the bulbous portion and the "bundt" bowl to drop into a collection area 275 and be removed from the system through water outlet pipe 185 and overflow port 187.

Because the inner tube 230 narrows to the narrower cylindrical portion 260, air therein is accelerated causing the space 280 between the inner tube 230 and the bulbous head 141 to act as a venturi and draw the newly dried air from within the bulbous portion to be passed to an air cycle machine (not shown).

Air discharged by the condenser 110 is: slowed by the swirl blocker 210; guided into the inlet tube 135 of the cartridge 130 by the inlet radius 200; swirled by swirl vanes 220 to enable the air to deposit droplets entrained therein onto the inside of the inlet tube 135; and then a portion of the air enters the inner tube 230 and is accelerated to pull air out of the tortuous path 225; and a portion of the air pushes the droplets into the tortuous path 225, is slowed to allow the droplets to drop by gravity to the drain 185, and then drawn out of the tortuous path 225 by the air in the inner tube 230.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A condenser for an aircraft, the condenser having:
   a header for collecting fluid exiting the condenser, the header including:
      an opening for allowing fluid to enter the header,
      a trough situated to receive fluid that enters the opening, and
      sides extending between the opening and the trough, the sides being angled inward from the opening to the trough for directing fluid toward the trough; and
   a collector for collecting water in air passing from the condenser, the collector being disposed at least partially within the trough of the header, the collector having at least two surfaces that establish a tortuous path that is configured to reduce a speed of movement of air and water droplets following the tortuous path, at least one of the surfaces being configured to guide water droplets by force of gravity out of the collector separate from the air following the tortuous path.

2. The condenser of claim 1 wherein the header comprises:
   a swirl blocker for minimizing air swirls in the header to allow air in the condenser to readily enter the collector.

3. The condenser of claim 2 wherein the swirl blocker depends from the collector.

4. The condenser of claim 2 wherein the header comprises a drain for eliminating water in the header.

5. The condenser of claim 1 wherein the condenser comprises an inlet radius for guiding air from the condenser into the collector.

6. The condenser of claim 1, wherein
   the header has a first cross-sectional dimension; and
   the trough has a second cross-sectional dimension aligned with the first cross-sectional dimension; and
   the second cross-sectional dimension is smaller than the first cross-sectional dimension.

7. The condenser of claim 1, wherein
   the opening is generally rectangular.

8. The condenser of claim 1, wherein the sides have a curvilinear profile along a direction from the opening to the trough.

9. The condenser of claim 8, wherein the sides are at least partially convex inside the header.

10. The condenser of claim 9, wherein the sides are at least partially concave inside the header.

11. A condenser for an aircraft, the condenser having:
    a header for collecting fluid exiting the condenser, the header including an opening for allowing fluid to enter the header and a trough situated to receive fluid that enters the opening, the header having a first surface that slants inward from the opening to the trough for directing fluid toward the trough, and
    a cartridge for collecting water in air passing from the condenser, the cartridge being disposed at least partially within the trough of the header, at least one of the cartridge and the header having at least two surfaces that establish a tortuous path that is configured to reduce a speed of movement of air and water droplets following the tortuous path, at least one of the two surfaces being configured to guide water droplets by force of gravity out of the condenser separate from the air following the tortuous path.

12. The condenser of claim 11 wherein the header comprises:
    a swirl blocker for minimizing pressure in the header to allow air in the condenser to readily enter the collector.

13. The condenser of claim 12 wherein the swirl blocker depends from the cartridge.

14. The condenser of claim 11 wherein the cartridge comprises an inlet radius for guiding air from the condenser into the collector.

15. The condenser of claim 11 wherein the header comprises a drain for eliminating water in the header.

16. The condenser of claim 11, wherein
    the header has a first cross-sectional dimension; and
    the trough has a second cross-sectional dimension aligned with the first cross-sectional dimension; and
    the second cross-sectional dimension is smaller than the first cross-sectional dimension.

17. The condenser of claim 11, wherein
    the opening is generally rectangular.

18. The condenser of claim 11, wherein the first surface has a curvilinear profile along a direction from the opening to the trough.

19. The condenser of claim 18, wherein the first surface is at least partially convex inside the header.

20. The condenser of claim 19, wherein the first surface is at least partially concave inside the header.

* * * * *